Figure 1:
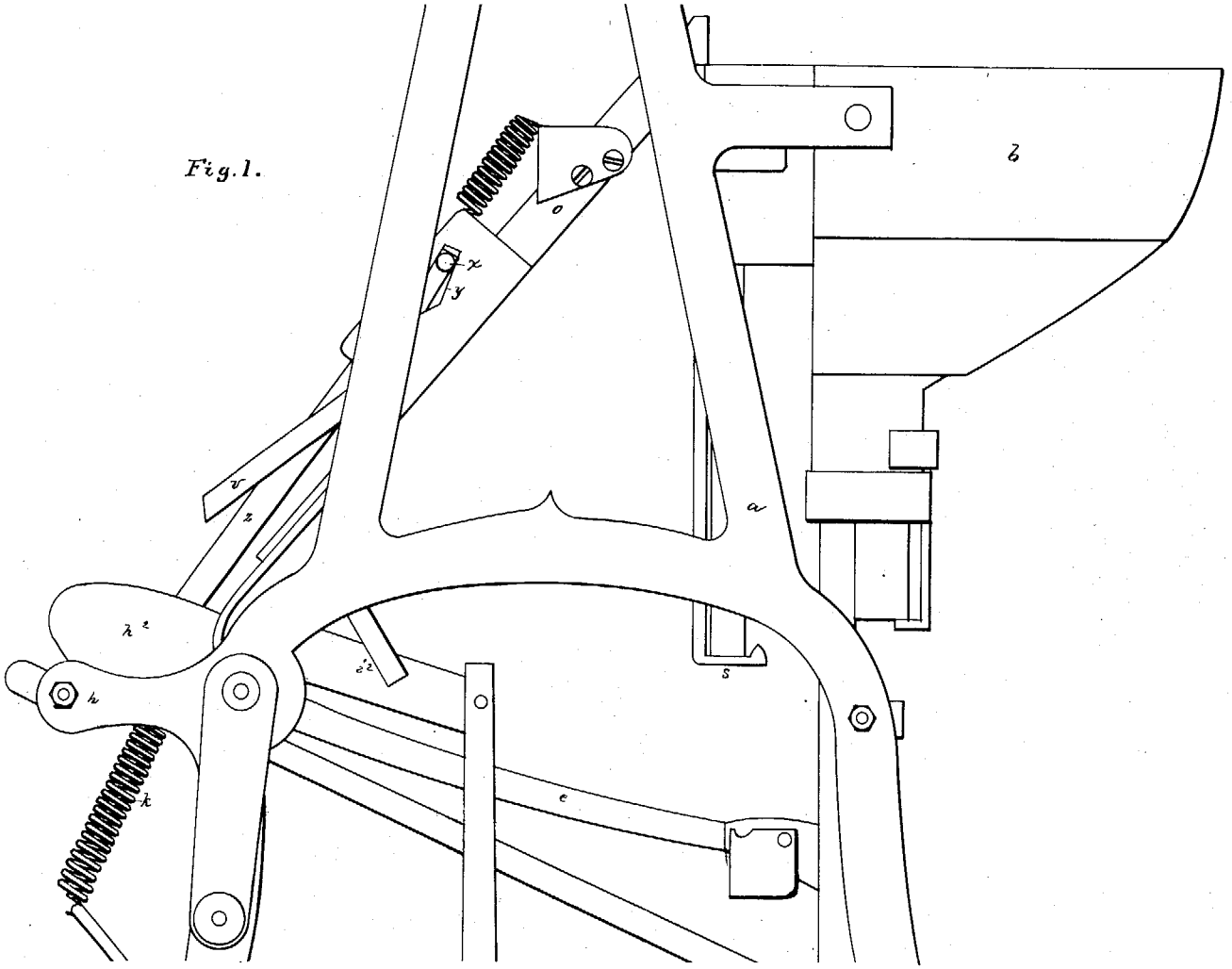

3 Sheets—Sheet 1.

B. BEVELANDER.

Assignor to the Globe Nail Co.

NAIL ASSORTING AND FEEDING MACHINE.

No. 7,548. Reissued March 6, 1877.

Witnesses.
S. H. Latimer,
W. F. Pratt.

Inventor.
Benjamin Bevelander
assorto Globe Nail Company
per Mosby & Gregory.
Attys.

3 Sheets—Sheet 2.

B. BEVELANDER.

Assignor to the Globe Nail Co.

NAIL ASSORTING AND FEEDING MACHINE.

No. 7,548. Reissued March 6, 1877.

Witnesses.
L. H. Latimer.
W. J. Pratt.

Inventor,
Benjamin Bevelander
Assr to Globe Nail Company
per Crosby & Gregory.
Attys.

3 Sheets—Sheet 3.

B. BEVELANDER.

Assignor to the Globe Nail Co.

NAIL ASSORTING AND FEEDING MACHINE.

No. 7,548. Reissued March 6, 1877.

Witnesses.

Lott Latimer.

W. A. Pratt.

Inventor.

Benjamin Bevelander

Assor to Globe Nail Company per Crosby & Gregory Att'ys.

UNITED STATES PATENT OFFICE.

BENJAMIN BEVELANDER, OF BOSTON, MASSACHUSETTS, ASSIGNOR TO THE GLOBE NAIL COMPANY.

IMPROVEMENT IN NAIL ASSORTING AND FEEDING MACHINES.

Specification forming part of Letters Patent No. 135,312, dated January 28, 1873; reissue No. 7,548, dated March 6, 1877; application filed February 9, 1877.

*To all whom it may concern:*

Be it known that I, BENJAMIN BEVELANDER, of Boston, in the county of Suffolk and State of Massachusetts, have invented certain new and useful Improvements in Nail Assorting and Feeding Machines, which are fully described in the following specification, and delineated in the accompanying drawings.

The invention relates particularly to the construction and organization of a mechanism by which horseshoe-nail blanks are taken from a loose assemblage and delivered head first and right face up to a rolling-machine, or to any other mechanism, or to any receptacle designed to receive them, successively, head first and right face up.

In my machine I throw the blanks loosely into a hopper provided with a reciprocating slide, having an inclined top or face, that, in rising, picks up, and at the completion of its ascent discharges a blank or blanks into a second compartment or box, provided with an inclined bottom, and containing a vertically-reciprocating lifter, having an inclined top adapted to elevate and discharge a blank into a chute, down which it moves until it reaches a stop. Passing this stop the blank approaches and moves under a gage, provided the blank is right face up; but if it rests upon its edge or its head-projecting face, the gage will stop it. After the blank passes the gage it meets a directing device, which operates to turn the blank so that its head thereafter leads in the further movement of the blank down the chute. The invention shows a slide-bar to "right" the blank should it arrive at the gage in any other position except with the straight or flat face of the nail against the chute, and also a blank-starter to act against the head of a blank not properly tipped and discharged from the directing device.

This invention consists, primarily, in an organization of mechanism to automatically separate or select horseshoe-nail blanks, and present them one by one, head first and right face up, to a rolling-machine, or other mechanism for an equivalent purpose.

Figure 2:
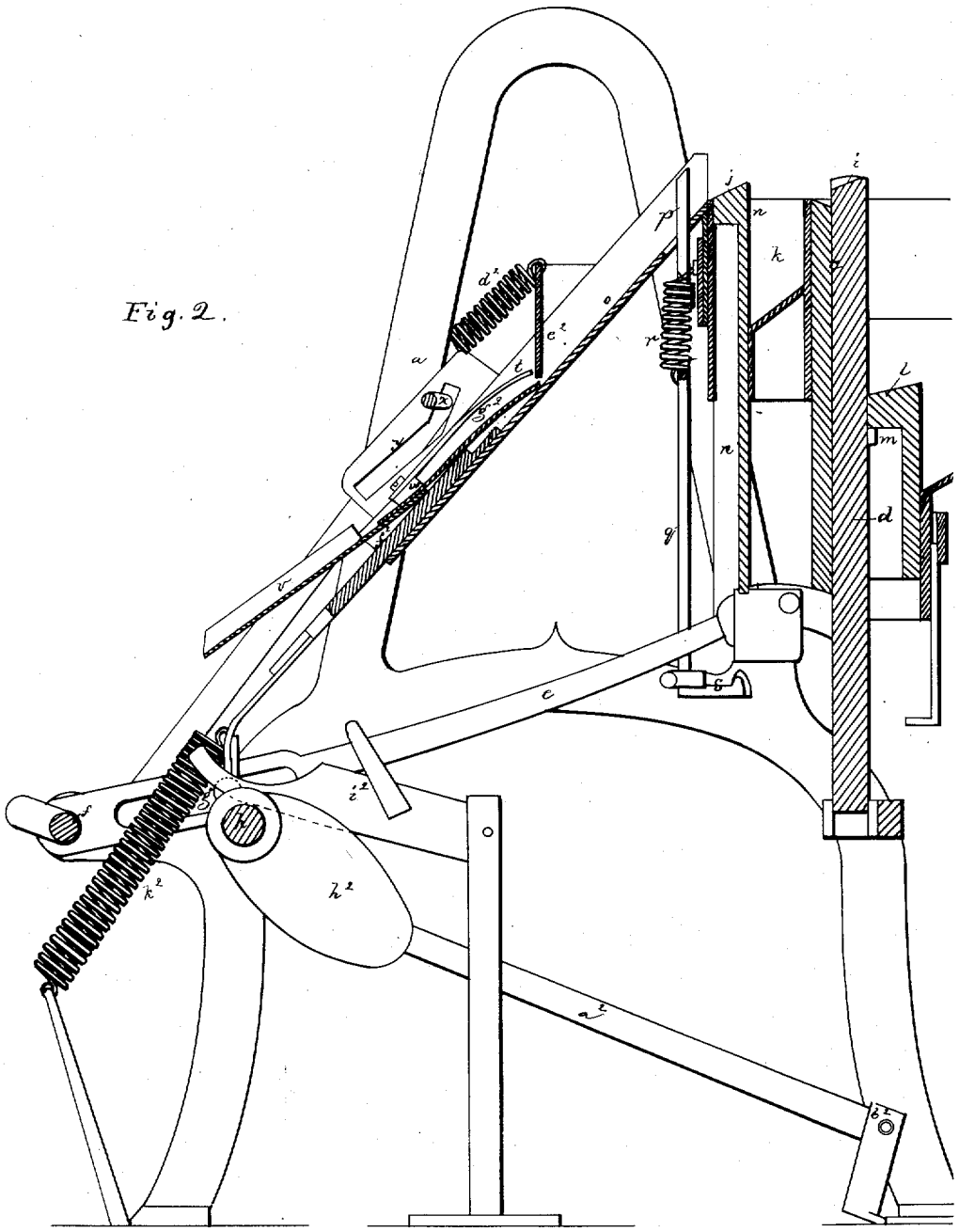
Figures 3, 4:
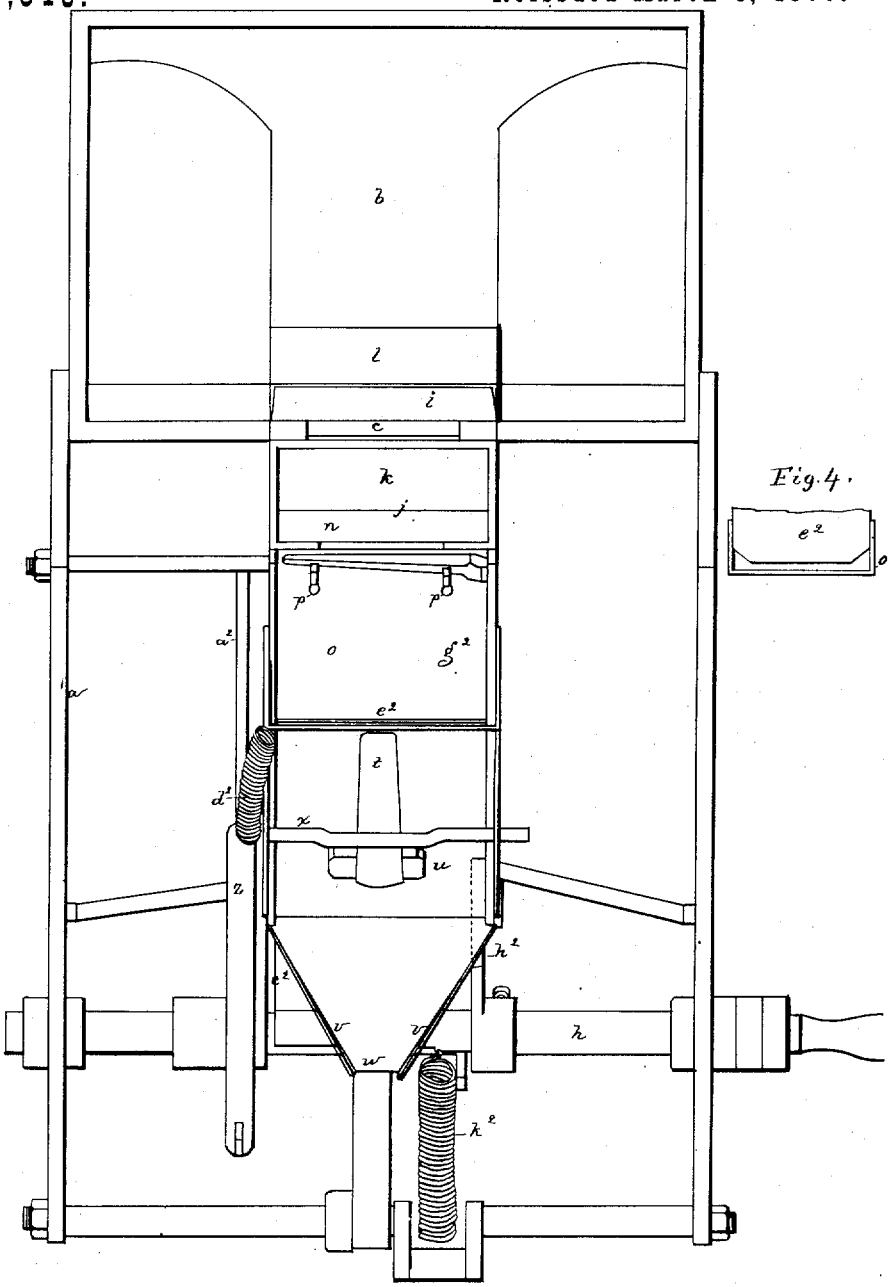

Figure 1 represents, in side elevation, a machine embodying my invention; Fig. 2, a sectional elevation, and Fig. 3 a plan thereof; Fig 4, a detail of the gage and chute.

*a* denotes a frame, at one end of which is a box or hopper, *b*, having three inclined sides, extending inward toward the front wall *c*, which is vertical. Extending up into the bottom of the hopper against the wall *c*, and forming part of such bottom when at its lowest position, is a vertically-moving slide, *d*, jointed by a link or lever, *e*, to a cross-rod, *f*, said link being raised and lowered to reciprocate the slide in suitable guides by a crank on a driving-shaft, *h*. The slide has an inclined top or face, *i*, which, when the lifter is at its highest position, stands just back of the mouth of a compartment or chamber, *k*. Horse-nail blanks supplied within the hopper *b*, and above the upper end or face of slide *d*, will be raised, one or more at a time, by the slide, and when the face *i* is at its highest position such blank or blanks will pass therefrom into the chamber *k*. To agitate and insure the lodgment of one or more blanks upon the lifter *d*, a second slide, *l*, may be located just back of the slide *d*. The slide *l* is raised by a pin, *m*, extended from the lifter *d*, which meets it, when the lifter rises some distance, and it falls by gravity or by the stress of a suitable spring when the slide descends. The slide *l* is preferably elevated after the slide *d* has partially risen, and in descending it reaches its lowest position before the lifter *d* arrives at the bottom of the hopper. The top face of slide *l* is inclined to meet the face *i* of the slide *d*, such inclination and the movement of the agitator-slide *l* almost always insuring the lodgment of one or more blanks upon the lifter. The bottom of the chamber *k* is also inclined, and its front portion is formed by the top surface of lifter *n*, upon which but one blank will generally lodge. This lifter may be raised by the link *e*, which meets its bottom, and may descend by gravity, or by the stress of a suitable spring. When elevated its face *j* is brought into position to permit the blank lodged upon it to slide forward by gravity onto a downwardly-inclined chute, *o*. When the blank slides over upon the chute it lodges against two pins, *p*, where it stops until the blank in advance of it has been discharged. These pins extend from a rod, *q*, passing through guide-slots in the chute, are held up by a suitable spring, *r*, and drawn down by an arm, *s*, which, extended from the rod, is struck by the lifter *n* when it descends, the lowering of the pins leaving the blank free to slide down the chute.

If the blank placed in the chute, as described, rests with its flat side against the bottom of the chute, or right face up, it will descend in the chute, passing under the gage-plate $e^2$, the space between the lower edge of such gage-plate and the chute-bottom being of a shape to permit its passage when the flat side of the nail rests against the chute-bottom. The outline of the opening between the gage and chute is shown in Fig. 4. Passing under the gage the nail-blank enters between a finger, *t*, and a plate, $g^2$, forming part of the chute-surface, and descends until it strikes a directing bar or device, *u*, placed midway the chute. The momentum of the blank as it strikes the directing device is sufficient to cause the blank to tip or move over it in such manner as to insure the head passing the bar first, which so directs and places the blank in the chute that the head thereafter leads or remains in advance of the point as the blank continues its descent to the rolling-machine, or to other device to receive it.

The narrowing side flanges *v* assist in retaining the blank in position-head first. The blank is discharged at the opening *w*. If the blank, as it strikes the directing device *u*, does not tip sufficiently to cause it to slide down therefrom, I may start or dislodge it by means of a blank starter, *x*, extended across the chute. This blank-starter is composed of a bar, having its ends fitted in irregular guide-slots *y*. It is drawn downward by a link, *z*, jointed to a lever, $a^2$, pivoted at $b^2$, and a cam, $c^2$, on the driving-shaft, and it is elevated by a spring, $d^2$. When the blank-starter rests in the highest portion of the guide-slots it cannot strike the blank; but as the starter is moved down, it will strike the head of a blank, provided there should be a blank in the chute which was not tipped sufficiently by the directing-bar to move past it down the chute, and will start such blank down the chute head first. If the blank placed in the chute at top has its flat or wrong side up, the gage-plate will detain it.

To right the blank, a slide-plate, $f^2$, slides up under the gage-plate after each descent of the pins *p*, that let the blank down the chute. This slide is raised by a cam, $h^2$, that strikes a lever, which presses against the slide, a spring, $k^2$, drawing it down when the cam $h^2$ passes the lever. As the front or upper edge of the slide advances against the blank it overturns the blank, and brings it upon its flat side, when it will slip under the gage-plate and slide down to the directing device. The plate $g^2$ is formed as a spring, its front end being made thin or brought to an edge, so that when pressed down its surface will be nearly flush with the chute-surface above it, its spring permitting it to rise for the slide to pass under it, the plate springing down when the slide moves back. By these means the blanks are selected or separated, and delivered one by one, head foremost and right face up.

By referring to Fig. 4, it will be noticed that the passage between the lower face of the gage $e^2$ and the chute on which the blank rests is, from each toward the other end, of a shape corresponding in longitudinal section with an ordinary horse-nail blank. This opening, shaped as shown, will permit the passage of blanks that rest with their flat faces upon the chute, the head portions in such case projecting laterally from one face of the blank, (herein denominated the right face,) projecting upward, the uppermost face of the blank in such case conforming in shape with the opening below the gage.

The upper faces of the slide-bar and lifter are substantially horizontal from end to end, to lift the blanks at head and point evenly, to place them on the chute, and are beveled from edge to edge, to permit the blanks to fall therefrom by gravity.

The specific devices and the details of construction and arrangement may, of course, be varied without departure from the essence of the invention.

I claim—

1. In a machine designed to be adapted to automatically deliver horseshoe-nail blanks, and present them one by one to a rolling-machine, the inclined chute, provided with a bottom to support a nail-blank, and a lifter to present a blank in the chute, in combination with a directing device to turn the nail and cause its head to move down the chute in advance of its point, substantially as described.

2. In a machine designed to be adapted to automatically deliver horseshoe-nail blanks, and present them one by one to a rolling-machine, the combination, with a chute, of a gage, constructed and arranged with relation to the walls of the chute, to present enlarged head-receiving passages at the ends of the gage, to permit the passage of all blanks having their right faces in one direction, and to prevent the passage of all blanks having their right faces in an opposite direction, substantially as described.

3. A hopper provided with a slide-bar to elevate a nail-blank from a mass of blanks, in combination with a second compartment, provided with a lifter to elevate a blank placed therein, substantially as described.

4. In combination, a chute to support the flat face of a horse-nail blank, a gage above the chute, and blank-shaped, to permit the passage of only such blanks as have their straight sides against the chute, and a directing device to turn the head of the blank passing down the chute in advance of its point, to deliver the blank head first from the chute, substantially as described.

5. A chamber to contain horse-nail blanks, and a lifter therein, in combination with a chute and a stop to hold the blank in advance of a gage for the blank, substantially as described.

6. The combination, with a directing-bar, *u*, and chute, of a starting-bar, to strike the head of the nail and start it in advance of the point, substantially as described.

7. The gage-plate and chute, in combination with the slide, to right the nail-blank, substantially as described.

8. In combination, a chamber to contain horse-nail blanks, a lifter to elevate a blank therefrom, a chute, a stop to hold the blanks in advance of a gage, a gage to permit the passage of the nails that rest with their flat faces next to the chute, and mechanism to direct the head of the blank in advance of its point, substantially as described.

9. The hopper and slide to lift a nail-blank, in combination with an agitator, to loosen or move the nail-blanks to fall upon the slide, substantially as described.

BENJAMIN BEVELANDER.

Witnesses:
G. W. GREGORY,
W. J. PRATT.